United States Patent
Aoki et al.

(10) Patent No.: US 11,526,245 B2
(45) Date of Patent: Dec. 13, 2022

(54) TOUCH PANEL EQUIPMENT FOR AIR CONDITIONING

(71) Applicant: DENSO WAVE INCORPORATED, Aichi-pref. (JP)

(72) Inventors: Shunya Aoki, Chita-gun (JP); Yuya Morita, Chita-gun (JP); Toru Hattori, Chita-gun (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 0 days.

(21) Appl. No.: 17/032,344

(22) Filed: Sep. 25, 2020

(65) Prior Publication Data

US 2021/0165530 A1 Jun. 3, 2021

(30) Foreign Application Priority Data

Dec. 2, 2019 (JP) .............................. JP2019-217678

(51) Int. Cl.
*G06F 3/16* (2006.01)
*G06F 3/044* (2006.01)

(52) U.S. Cl.
CPC .......... *G06F 3/0446* (2019.05); *G06F 3/0447* (2019.05)

(58) Field of Classification Search
CPC ...... G06F 3/017; G06F 1/163; G06F 3/04817; G06F 3/167; G06F 3/16; G06F 3/04883; G06F 3/044; G06F 3/0488; G06F 3/0446; G06F 3/0447; F24F 11/001; G05B 15/02; A41D 1/002; A41D 31/00; D03D 1/0088; D10B 2401/16; D10B 2401/18
See application file for complete search history.

(56) References Cited

U.S. PATENT DOCUMENTS

| 2008/0048619 A1* | 2/2008 | Yoshida | B60L 58/15 320/134 |
| 2008/0158167 A1* | 7/2008 | Hotelling | G06F 3/041661 345/173 |
| 2011/0199105 A1* | 8/2011 | Otagaki | G06F 3/0446 324/679 |
| 2012/0162849 A1* | 6/2012 | Tang | G06F 1/24 361/220 |

(Continued)

FOREIGN PATENT DOCUMENTS

JP 2016-009408 A 1/2016

Primary Examiner — Lunyi Lao
Assistant Examiner — Jarurat Suteerawongsa
(74) Attorney, Agent, or Firm — Oliff PLC

(57) ABSTRACT

A touch panel equipment for air conditioning has a plurality of electrodes arranged in two-dimensional matrix, a touch sensing IC for scanning capacitance of the electrodes, and a touch panel controller for deciding a touch position from the capacitance sensed by said touch sensing IC. The touch panel controller resets the touch sensing IC when the capacitance of the electrodes located in a check area is not changed during predetermined threshold timings, and does not reset the touch sensing IC when the capacitance of the electrodes located in the check area is changed within the threshold timings. As the touch panel controller resets the touch sensing IC due to the change of the capacitance value of the electrodes located in the check area, the resetting operation is operated automatically so that the touch panel equipment could avoid the user's external work.

7 Claims, 12 Drawing Sheets

(56) References Cited

U.S. PATENT DOCUMENTS

| | | | |
|---|---|---|---|
| 2013/0300707 A1* | 11/2013 | Hersh | G06F 3/0443 |
| | | | 345/174 |
| 2014/0115311 A1* | 4/2014 | Wang | G06F 9/4403 |
| | | | 713/2 |
| 2015/0153887 A1* | 6/2015 | Kim | G06F 3/0446 |
| | | | 345/173 |
| 2015/0205405 A1* | 7/2015 | Yumoto | G06F 3/041661 |
| | | | 345/174 |
| 2015/0379914 A1* | 12/2015 | Imai | G09G 3/20 |
| | | | 345/204 |
| 2016/0378236 A1* | 12/2016 | Katsuki | G01L 1/16 |
| | | | 345/173 |
| 2017/0010711 A1* | 1/2017 | Sugiyama | F24F 11/30 |
| 2017/0092024 A1* | 3/2017 | Slama | G07C 5/0816 |
| 2017/0269784 A1* | 9/2017 | Nakajima | G06F 3/03547 |
| 2019/0302986 A1* | 10/2019 | Iwasa | H04N 5/232945 |

* cited by examiner

FIG.10

| 2 | 1 | 3 | 2 | 1 | 0 | 0 | 1 | — A1
|---|---|---|---|---|---|---|---|
| 0 | 0 | 2 | 3 | 1 | 2 | 2 | 1 |
| 1 | 1 | 3 | 3 | 0 | 1 | 1 | 2 |
| 3 | 0 | 2 | 1 | 0 | 0 | 0 | 3 |
| 2 | 1 | 2 | 0 | 2 | 1 | 0 | 2 |
| 1 | 2 | 2 | 0 | 1 | 3 | 1 | 2 |

110

⇩

110

| 1 | 0 | 1 | 2 | 2 | 3 | 1 | 0 |
|---|---|---|---|---|---|---|---|
| 2 | 1 | 0 | 1 | 3 | 1 | 1 | 0 |
| 0 | 1 | 2 | 3 | 1 | 0 | 0 | 1 |
| 0 | 1 | 1 | 1 | 1 | 1 | 2 | 1 |
| 1 | 3 | 1 | 2 | 1 | 0 | 1 | 3 |
| 3 | 1 | 0 | 1 | 0 | 1 | 0 | 1 |

| 1 | 0 | 1 | 2 | 2 | 3 | 1 | 0 |
|---|---|---|---|---|---|---|---|
| 2 | 1 | 0 | 1 | 3 | 1 | 1 | 0 |
| 0 | 1 | 2 | 3 | 1 | 0 | 0 | 1 |
| 0 | 1 | 1 | 1 | 1 | 1 | 2 | 1 |
| 1 | 3 | 1 | 2 | 1 | 0 | 1 | 3 |
| 3 | 1 | 0 | 1 | 0 | 1 | 0 | 1 |

FIG.12

|   |   |   |   |   |   |   |
|---|---|---|---|---|---|---|
| 1 | 0 | 1 | 2 | 2 | 3 | 1 | 0 |
| 2 | 1 | 0 | 1 | 3 | 1 | 1 | 0 |
| 0 | 1 | 2 | 3 | 1 | 0 | 0 | 1 |
| 0 | 1 | 1 | 1 | 1 | 1 | 2 | 1 |
| 1 | 3 | 1 | 2 | 1 | 0 | 1 | 3 |
| 3 | 1 | 0 | 1 | 0 | 1 | 0 | 1 |

|   |   |   |   |   |   |   |   |
|---|---|---|---|---|---|---|---|
| 1 | 0 | 1 | 2 | 2 | 3 | 1 | 0 |
| 2 | 1 | 0 | 1 | 3 | 1 | 1 | 0 |
| 0 | 1 | 2 | 3 | 1 | 0 | 0 | 1 |
| 0 | 1 | 1 | 1 | 1 | 1 | 2 | 1 |
| 1 | 3 | 1 | 2 | 1 | 0 | 1 | 3 |
| 3 | 1 | 0 | 1 | 0 | 1 | 0 | 1 |

|   |   |   |   |   |   |   |
|---|---|---|---|---|---|---|
| 2 | 1 | 3 | 2 | 1 | 0 | 0 | 1 |
| 0 | 0 | 2 | 3 | 1 | 2 | 2 | 1 |
| 1 | 1 | 3 | 3 | 0 | 1 | 1 | 2 |
| 3 | 0 | 2 | 1 | 0 | 0 | 0 | 3 |
| 2 | 1 | 2 | 0 | 2 | 1 | 0 | 2 |
| 1 | 2 | 2 | 0 | 1 | 3 | 1 | 2 |

110, A1

⇩

|   |   |   |   |   |   |   |
|---|---|---|---|---|---|---|
| 1 | 0 | 1 | 2 | 2 | 3 | 1 | 0 |
| 2 | 1 | 0 | 1 | 3 | 1 | 1 | 0 |
| 0 | 1 | 2 | 3 | 1 | 0 | 0 | 1 |
| 0 | 1 | 1 | 1 | 1 | 1 | 2 | 1 |
| 1 | 3 | 1 | 2 | 1 | 0 | 1 | 3 |
| 3 | 1 | 0 | 1 | 0 | 1 | 0 | 1 |

| 2 | 1 | 3 | 2 | 1 | 0 | 0 | 1 |
|---|---|---|---|---|---|---|---|
| 0 | 0 | 2 | 3 | 1 | 2 | 2 | 1 |
| 1 | 1 | 3 | 3 | 0 | 1 | 1 | 2 |
| 3 | 0 | 2 | 1 | 0 | 0 | 0 | 3 |
| 2 | 1 | 2 | 0 | 2 | 1 | 0 | 2 |
| 1 | 2 | 2 | 0 | 1 | 3 | 1 | 2 |

110, A1

⇩

| 1 | 0 | 1 | 2 | 2 | 3 | 1 | 0 |
|---|---|---|---|---|---|---|---|
| 2 | 1 | 0 | 1 | 3 | 1 | 1 | 0 |
| 0 | 1 | 2 | 3 | 1 | 0 | 0 | 1 |
| 0 | 1 | 1 | 1 | 1 | 1 | 2 | 1 |
| 1 | 3 | 1 | 2 | 1 | 0 | 1 | 3 |
| 3 | 1 | 0 | 1 | 0 | 1 | 0 | 1 |

110, A7

TOUCH PANEL EQUIPMENT FOR AIR CONDITIONING

CROSS-REFERENCE TO RELATED APPLICATION

This application is based on and claims the benefit of priority from earlier Japanese Patent Application No. 2019-217678 filed Dec. 2, 2019, the description of which is incorporated herein by reference.

BACKGROUND

1. Technical Field

The present disclosure relates to a capacitance touch panel equipment which is used to a controller for air conditioning.

2. Related Art

The capacitance touch panel equipment has been used for the controller for air conditioning in order to display a menu such as a target temperature and a target volume of the air as well as an input button for controlling the air conditioner. The capacitance touch panel has a sensing function which senses capacitance of a plurality of electrodes arranged in two-dimensional matrix and a deciding function which decides a touching position by the change of the sensed capacitance. Both the displaying the menu and the sensing the touching position are controlled by a computer having a touch sensing IC (Integrated Circuit) for sensing the capacitance of the electrodes and an MPU (Micro Processing Unit) calculating the touching position.

SUMMARY

Such computer having the touch sensing IC for sensing the capacitance of the electrodes and the MPU calculating the touching position may cause the error on the touch sensing IC when the static electrical charge is applied from the user to the touch sensing IC. So that the air conditioner may work unintentional temperature and/or unintentional humidity. In the case when such error is occurred, the user and/or the mechanic staff should repair the error by pushing a reset button provided on the capacitance touch panel equipment and/or by turning off the electric source. Such repairing the error makes the user inconvenience.

As to the one example of the present disclosure, a touch panel equipment for air conditioning has a plurality of electrodes arranged in two-dimensional matrix, a touch sensing IC for scanning capacitance of the electrodes, and a touch panel controller for deciding a touching position from the capacitance sensed by the touch sensing IC. The touch panel controller resets the touch sensing IC when the capacitance of the electrodes located in a check area is not changed during predetermined threshold timings, and does not reset the touch sensing IC when the capacitance of the electrodes located in the check area is changed within the threshold timings.

Since the touch panel equipment of the present disclosure is used as the controller for air conditioning, the environment of the touch panel equipment is relatively low humidity. Therefore, the static electrical charge may be occurred on the touch panel equipment more frequently than that used for another controller. As the touch panel controller resets the touch sensing IC when the capacitance of the electrodes located in the check area is not changed during the threshold timings such reset of the touch sensing IC is made automatically. So that, the error caused by the static electrical charge could be recovered in a short period without user's external work.

Since the capacitance value of the each of electrodes are varied due to the static electricity though the user does not touch the capacitance touch panel equipment, the change of the capacitance value of the each of electrodes means the touch sensing IC works normally. Accordingly, in the case when the capacitance of the electrodes located in the check area is not changed during the threshold timings, the touch sensing IC may work abnormally and should be reset.

As to the second embodiment of the touch panel equipment for air conditioning of the present disclosure, the check area includes a plurality of electrodes, and the touch panel controller adds the value of the capacitance of each of the electrodes located in the check area, resets the touch sensing IC when a total sum of the capacitance of the electrodes located in the check area is not changed during the threshold timings, and does not reset the touch sensing IC when the total sum of the capacitance of the electrodes located in the check area is changed within the threshold timings.

Since the touch panel controller of the second embodiment uses the total sum of the capacitance of the electrodes in the check area, the calculation for deciding whether or not the reset of the touch sensing IC is required becomes simplified, and therefore, the load of the touch panel controller becomes lower.

As to the touch panel equipment for air conditioning of the present disclosure, the check area is a part of the plurality of electrodes. Since the check area is only a part of the plurality of electrodes, the load for deciding whether or not the touch sensing IC should be reset is lower compare to that calculating every electrode.

As to the third embodiment of the touch panel equipment for air conditioning of the present disclosure, an area controller setting the check area is used. The area controller changes at least one of a position and a largeness of the check area from an original check area to a new check area when the capacitance of the electrodes located in the original check area is not changed during less than the threshold timings. The touch panel controller resets the touch sensing IC when the capacitance of the electrodes located in the new check area is not changed during the threshold timings, and does not reset the touch sensing IC when the capacitance of the electrodes located in the new check area is changed within the threshold timings.

Since the check area is varied by the area controller, the touch sensing IC could be reset in the case the possibility of the error caused by the static electrical charge of entire area of the electrodes is high, so that unnecessary reset is avoided effectively. On the other hand, in the case that the position and the largeness of the check area is fixed, the tough sensing IC may be reset though the malfunction is occurred only in the electrodes located in the check area and the electrodes located other area than the check area works correctively.

As to the touch panel equipment for air conditioning of the present disclosure, the area controller so sets the check area that at least a part of the original check area is included within the new check area. In the case when the capacitance value of the overlapping area of the original check area and the new check area is stabilized and the capacitance value of the original check area and the new check area other than the overlapping area is varied, malfunction of the electrodes in the overlapping area could be detected.

As to the touch panel equipment for air conditioning of the present disclosure, the area controller so sets the check area that the new check area is a different area from the original check area. Since the area is different between the original checking area and the new check area, the error occurred in the entire electrodes could be detected effectively.

As to the touch panel equipment for air conditioning of the present disclosure, the area controller so sets the check area that the largeness of the new check area is broader than that of the original check area. Accordingly, the touch sensing IC could be reset in the case when the possibility of that the error is occurred in the entire electrodes is presumed high.

The touch panel equipment of the present disclosure could be used in various way such as the air conditioning controller having the capacitance touch panel, the resetting method for resetting the touch panel equipment, the computer program for the computer having the touch panel equipment, and the memory installing the computer program for the computer having the touch panel equipment.

BRIEF DESCRIPTION OF THE DRAWINGS

FIG. 10 explains the change of the check area of the third embodiment.

FIG. 11 shows an example of the check area of another embodiment.

FIG. 12 shows an example of the check area of the other embodiment.

FIG. 13 shows an example of the check area of the other embodiment.

FIG. 14 explains the change of the check area of another embodiment.

FIG. 15 explains the change of the check area of the other embodiment.

DETAILED DESCRIPTION OF THE PREFERRED EMBODIMENTS

A. First Embodiment

A1. Equipment

Figure 1:
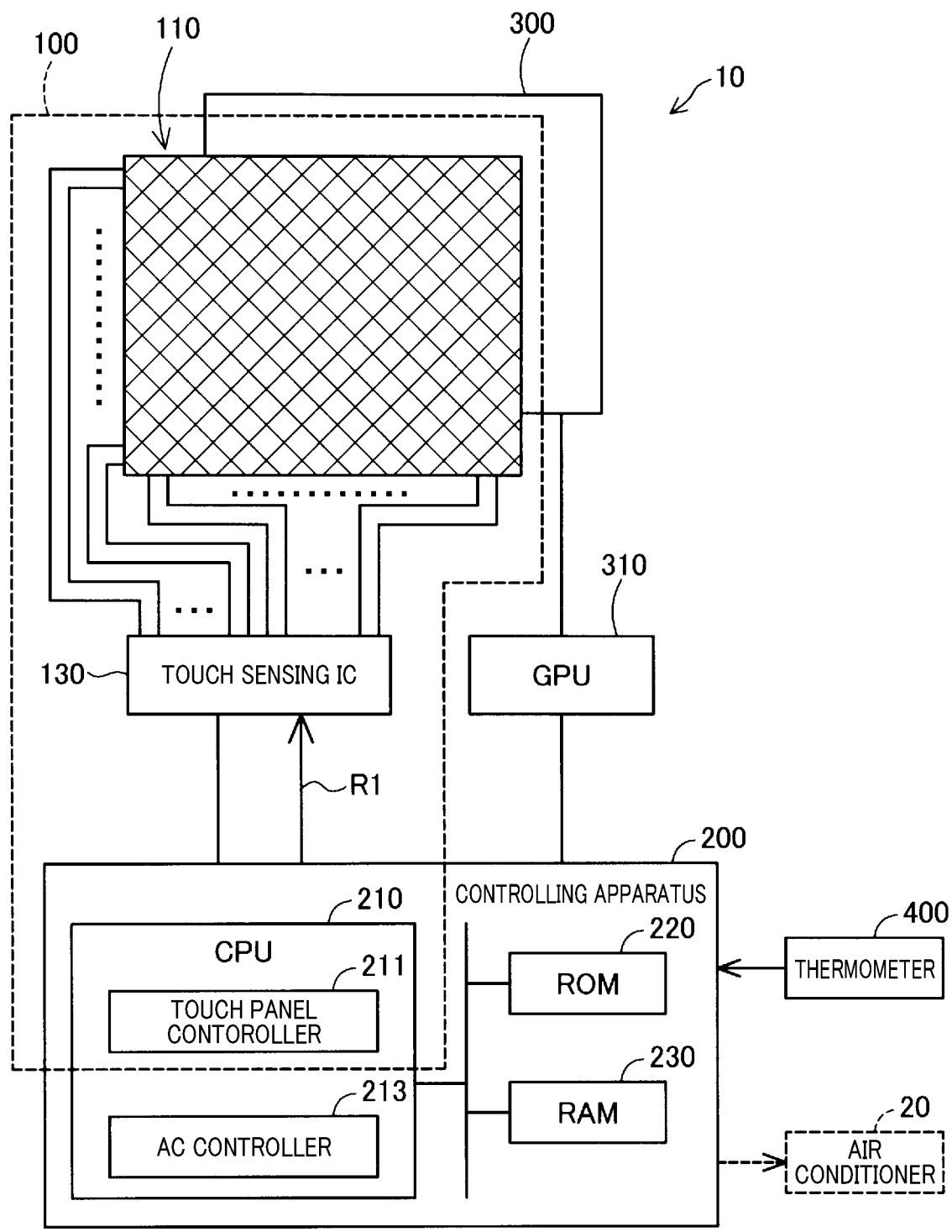
FIG. 1 is a block diagram showing essential function of an example of a touch panel equipment for air conditioning.

FIG. 1 is a block diagram showing essential function of an example of a touch panel equipment for a controller for air conditioning. A touch panel equipment 100 is used for an air conditioning controller 10, such controller 10 controls an air conditioner 20 in order to control a target temperature and/or an air volume of controlled warm or cool air. The air conditioning controller 10 receives the user's command via the touch panel equipment 100 and controls various parameters including temperature, humidity, and air volume. The controller 10 has a display 300, a GPU (Graphic Processing Unit) 310, a controlling apparatus 200 and a thermometer 400 other than the touch panel equipment 100.

The display 300 has a liquid crystal panel and displays various menus as well as the present temperature, the target temperature and target air volume.

The controlling apparatus 200 has a CPU 210, a ROM 220 and a RAM 230. The CPU 210 works as a touch panel controller 211 and an AC (Air Conditioning) controller 213 by commanding the RAM 240 using the controlling program installed in the ROM 220. The touch panel controller 211 so controls the touch panel equipment 100 that the touching position where the user touches is detected by a touch panel manipulation operation and that a touch sensing IC 130 is reset by a resetting operation. The AC controller 213 so controls the air conditioner 20 that the various menus are displayed on the display 300 by controlling the GPU 310, that the command signal detected by the touch panel controller 211 is sent to the air conditioner 20 and that the operation of the air conditioner 20 is monitored. The thermometer 400 detects the environmental temperature, but the thermometer 400 may detect the humidity instead of or in addition to the temperature. As the detected temperature from the thermometer 400 is input to the controlling apparatus 200, the AC controller 213 calculates the target temperature by using the detected temperature.

The touch panel equipment 100 is a capacitance touch panel and has a touch sensor area 110, the touch sensing IC (Integrated Circuit) 130 and the touch panel controller 211.

The touch sensor area 110 is a rectangular shape of 5 centimeters by 10 centimeters, for example, and has a plurality of electrodes arranged in two-dimensional matrix such as a number of electrodes positioned in a predetermined direction (X electrodes) and a number of electrodes positioned in a perpendicular direction (Y electrodes). The X electrodes and Y electrodes may be crossed other angle than ninety (90) degree. Both X electrodes and Y electrodes are transparence and located on the clear glass. As the static electricity is increased when the user putts his or her finger closer to the electrodes, the touch panel controller 211 calculates the touching position by using the change of the static electricity.

The touch sensing IC 130 is electrically connected with each of the X electrodes and the Y electrodes, and scans both the X electrodes and the Y electrodes in a predetermined timing such as several millisecond. The touch sensing IC also applies the voltage on the selected electrode, and senses the capacitance value of each of the X electrodes and the Y electrodes by sensing the difference of the capacitance value of one electrode and that of next electrode. As the touch sensing IC 130 is electrically connected with the controlling apparatus 200, the touch panel controller 211 receives the capacitance value of each of the X electrodes and the Y electrodes sensed by the touch sensing IC 130. An analog-digital converter which is not shown in FIG. 1 converts the analog signal form the touch sensing IC to the digital capacitance value of 0-255. Such digital capacitance value is inputted in to the CPU 210, so that the touch panel controller 211 receives the digital capacitance value. The touch sensing IC 130 is also connected with the controlling apparatus 200 via a reset line R1 and a reset port, so that the controlling apparatus 200 could reset the touch sensing IC 130 by sending the reset signal via the reset line R1.

The sensing function of the tough sensing IC 130 for sensing the static electricity may be caused malfunction due to the static electrical charge when the user manipulates the touch panel equipment 100. Once such malfunction is occurred, the touch sensing IC 130 cannot sense the capacitance value of each of electrodes, so that the fixed capacitance value is sent to the touch panel controller 211. However, the touch sensing IC 130 of the present disclosure could automatically reset by using the later described resetting operation.

A2. Touch Panel Manipulating Operation

Figure 2:
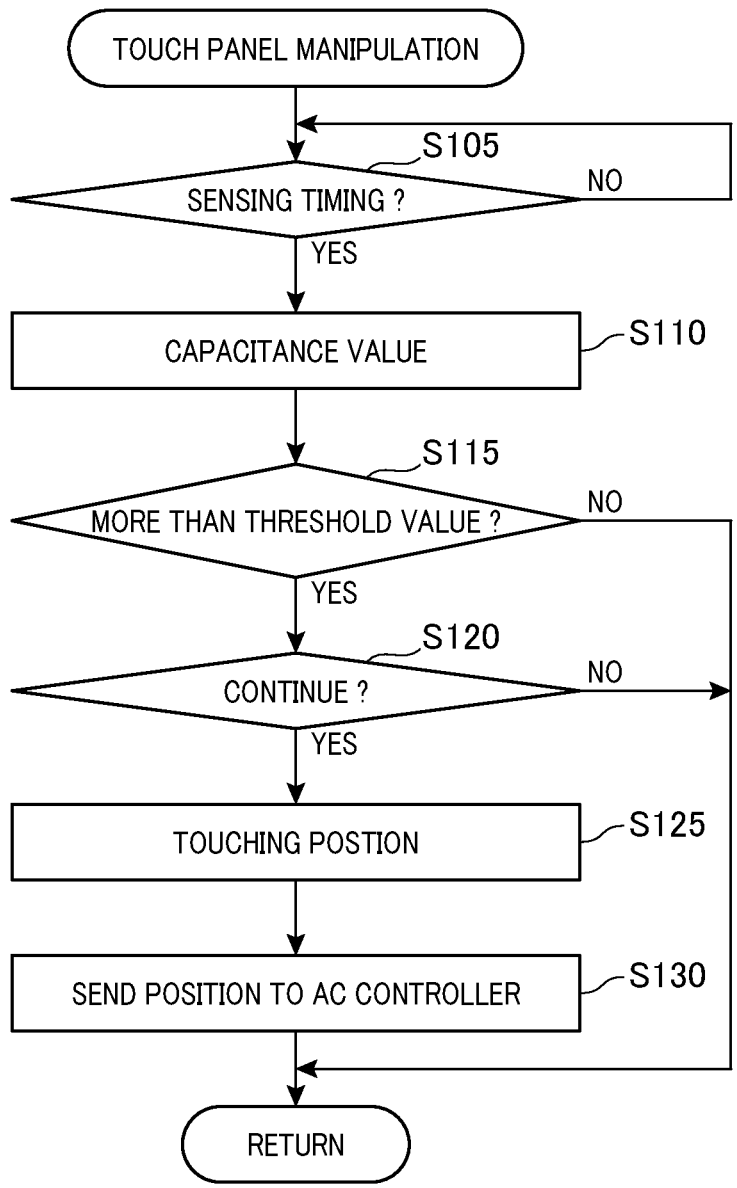
FIG. 2 is a flow chart explaining a touch panel mamipuration operation of the touch panel equipment.

FIG. 2 is a flow chart explaining a touch panel manipulating operation of the capacitance touch panel equipment 100. The operation includes the detecting operation for detecting the touching position in the touch panel equipment 100 and the sending operation for sending the signal of the touching position to the AC controller 213. Such operation is controlled by the touch panel controller 211 when the touch panel equipment 100 is turn on. As explained above, the touch sensing IC 130 scans electrodes in a predetermined interval, applies the voltage on the selected electrodes and senses the capacitance value of each of the electrodes.

The touch panel controller 211 decides whether or not sensing timing for sensing the touching position is come (S105). Such sensing timing of the present disclosure is the timing the scanning of entire electrodes in the touch sensor area is completed. In the case the sensing timing has not been completed (S105: No), the step of S105 is continued until the entire electrodes are scanned.

In the case the sensing timing is completed (S105: Yes), the touch panel controller 211 receives the capacitance value of each of electrodes sensed by the touch sensing IC 130 (S110) and decides whether or not the electrode having more capacitance value than the predetermined threshold value is existing. The threshold value is decided by adding the change of the capacitance value when the user put his or her finger close to the electrode to the capacitance value when the finger of the user is separated from the electrode. One example of the threshold value is fifty (50). The capacitance value when the finger of the user is separated from the electrode is detected during the calibration is done right after the touch panel equipment 100 turns on, for example.

In the case the electrode having more capacitance value than the threshold value is not detected (S115: No), the operation returns to the step S105, on the other hand, in the case the electrode having more capacitance value than the threshold value is detected (S115: Yes), the touch panel controller 211 checks whether or not such electrode having more capacitance value than the threshold value continues such capacitance value more than a predetermined threshold timing (S120). The predetermined timing of the present disclosure is two (2), for example, but any number of timing could be used. This operation (S120) avoids the user's unintentional situation such as the capacitance value is increased more than the threshold value accidentally when the user touch the touch panel equipment 100 in a quite short while.

When the capacitance value more than the threshold value continues more than two (2) timings (S120: Yes), the touch panel controller 211 decides the position of such electrode as the touching position (S125). In the case when a plurality of electrodes have more capacitance value than the threshold value, the touch panel controller 211 calculates the center position of such electrodes as the touching position. The touch panel controller 211 sends the touching position decided by this step (S125) to the AC controller 213 (S130). The AC controller 213 decides the user's command by the menu displayed in the display 300 and the touching position and sends the electrical signal of the user's command to the air conditioner 20. The AC controller 213 also monitors the current situation of the air conditioner 20. After the operation is completed (S130), the manipulating operation then returns to the step S105.

A3. Resetting Operation

Figure 3:
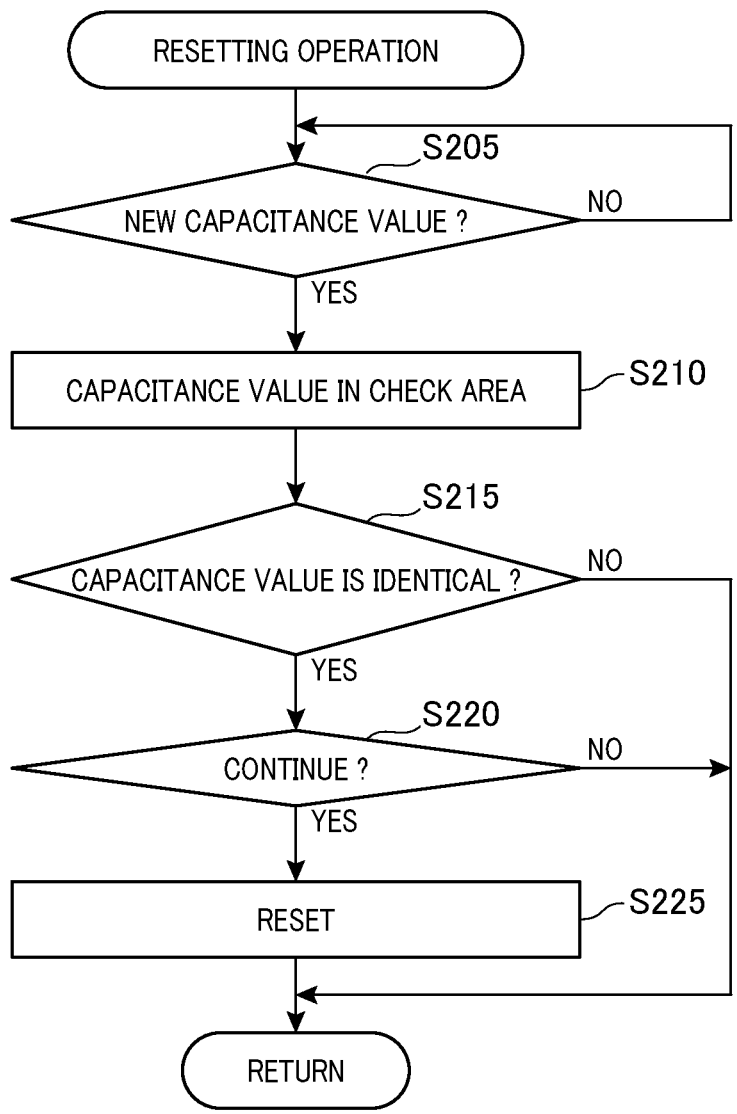
FIG. 3 is a flow chart explaining a resetting operation of a first embodiment.

FIG. 3 is a flow chart explaining a resetting operation of a first embodiment. The resetting operation for resetting the touch sensing IC 130 is operated by the touch panel controller 211 while the touch panel equipment 100 turns on. Accordingly, the touch panel controller 211 operates both above explained the touch panel manipulating operation and the resetting operation. The touch panel manipulating operation and the resetting operation are carried out in series, but both operations may be operated simultaneously.

During the touch panel manipulating operation, the touch panel controller 211 also decides whether or not new capacitance value is inputted (S205). When this step S205 is applied to the entire electrodes, this step S205 is the same as the scanning of the step S105. However, this step S205 may apply on only the electrodes located in a check area. As this step S205 is continued while the new capacitance value in the selected area is not completed (S205: No), this step S205 continues until the scanning of the new capacitance value is completed.

When the scanning of the new capacitance value is completed (S205: Yes), the touch panel controller 211 calculates the capacitance value of the electrodes located in the check area which is the area for finding the malfunction of the touch sensing IC 130 (S210). The check area of the present disclosure has three (3) vertical electrodes and three (3) horizontal electrodes so that total nine (9) (3×3) electrodes are existing in the check area.

Figures 4, 5:
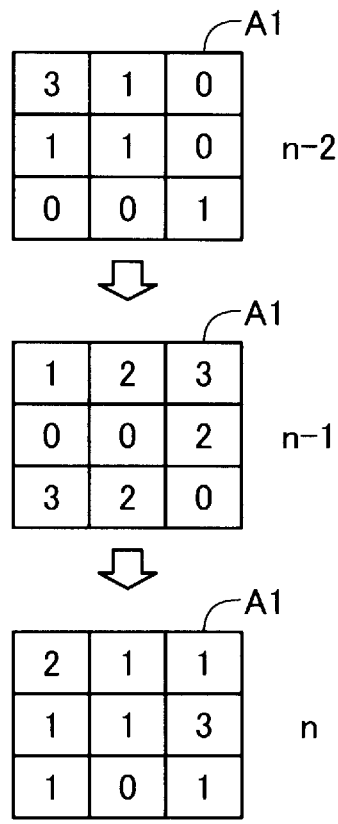
FIG. 4 shows a check area of the first embodiment.
FIG. 5 explains an example of the change of the capacitance value of the electrode located in the check area while a touch sensing IC works normally.

FIG. 4 is a schematic view of the check area A1 of the first embodiment. The intersections of the X electrodes and the Y electrodes, namely the positions between the contiguous electrodes, are described as the matrix in FIG. 4. The touch sensing IC 130 detects the capacitance value of the electrodes located in the intersection of FIG. 4. The check area A1 of this embodiment includes nine (9) electrodes located upper right corner of FIG. 4. Though the finger of the user is not located close to the check area A1, the capacitance value of the electrodes in the check area A1 may not be zero (0) due to the static electricity in the air. Accordingly, the capacitance value of some electrodes may be 1-3 as shown in FIG. 4. Compare to the threshold value of fifty (50) when the user touches the touch panel equipment 100, the capacitance value of one (1) to three (3) is small. The calculating step (S210) calculates the capacitance value of each of nine (9) electrodes located in the check area A1.

As shown in FIG. 3, the touch panel controller 211 decides whether or not the capacitance value of the electrodes located in the check area A1 of the present (n) step is identical with that of the last (n−1) step (S215). Such decision of the present embodiment is made for each of nine (9) electrodes located in the check area A1. In the case when the capacitance value of at least one (1) of nine (9) electrodes located in the check area A1 of the present (n) step is not identical with that of the last (n−1) step (S215: No), the operation returns to the step S205.

On the other hand, in the case when the capacitance value of every nine (9) electrode located in the check area A1 of the present (n) step is identical with that of the last (n−1) step (S215: Yes), the touch panel controller 211 then decides such identical value is continued more than threshold timings such as two (2) timings, for example. The threshold timing may be any timings other than two (2). In the case the capacitance value of the electrodes in the check area A1 varies within the threshold timings (S220: No), the operation returns to the step S205, namely, in the case the identical value is continues only one (1) time and the capacitance value of the electrodes on the check area A1 is varied next step (S220: No), the operation returns to the step S205. Therefore, the touch sensing IC does not be reset.

In the case the identical value continues more than the threshold timings, the touch panel controller 211 resets the touch sensing IC 130 (S225). After the completion of the step S225, the operation returns to the step S205.

FIG. 5 explains an example of the change of the capacitance value of the electrode located in the check area A1 while a touch sensing IC 130 works normally. As shown in this FIG. 5, the capacitance value of almost every electrode are varied between the last (n−1) step and the one step before last (n−2) step, and also the capacitance value of almost every electrode are varied between the present (n) step and the last (n−1) step. Such variation is caused by the variation of the static electricity in the air close to the touch panel equipment 100. Accordingly, the detected capacitance value of the electrodes located in the check area A1 should be varied while the touch sensing IC 130 works normally.

Figure 6:
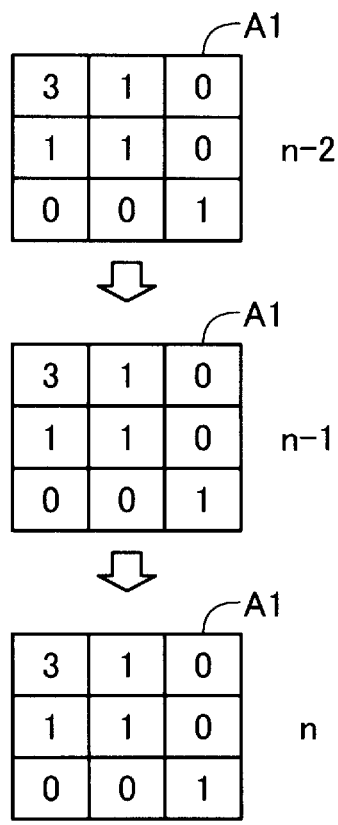
FIG. 6 explains an example of the change of the capacitance value of the electrode located in the check area while a touch sensing IC works abnormally.

FIG. 6 explains an example of the change of the capacitance value of the electrode located in the check area A1 while the touch sensing IC 130 works abnormally. As shown in this FIG. 6, the detected capacitance value of the electrodes in the check area of the one step before last (n−2) step, that of the last (n−1) step and that of the present (n) step is fixed to the same value in the case when the sensing function of the touch sensing IC 130 is damaged.

As described above, the touch panel equipment 100 of the first embodiment resets the touch sensing IC 130 while the detected capacitance value of the electrodes in the check area A1 are fixed to the same value more than the threshold timings (2 times), and does not reset the touch sensing IC 130 while the detected capacitance value of the electrodes in the check area A1 is varied within the threshold timings. Accordingly, the touch sensing IC 130 could automatically be reset when the sensing function of the touch sensing IC 130 for sensing the capacitance value has some damage without the user's external work. As the capacitance value of each of the electrode is varied due to the variation of the static electricity in the air next to the touch panel apparatus 100 though the user does not touch the touch panel equipment 100, the fixed detected capacitance value continuing more than the threshold timings indicates the malfunction of the touch sensing IC 130.

Since the electrodes in the check area A1 is only a part of the total electrodes (X electrodes and Y electrodes), the calculating load of the CPU 210 for detecting the malfunction of the touch sensing IC 130 could be lower compere to the load calculating the capacitance value of the entire electrodes.

Because the capacitance value of each of every electrode in the check area is compared between the last (n−1) step and the present (n) step, the malfunction of the touch sensing IC 130 could be found effectively.

B. Second Embodiment

Figure 7:
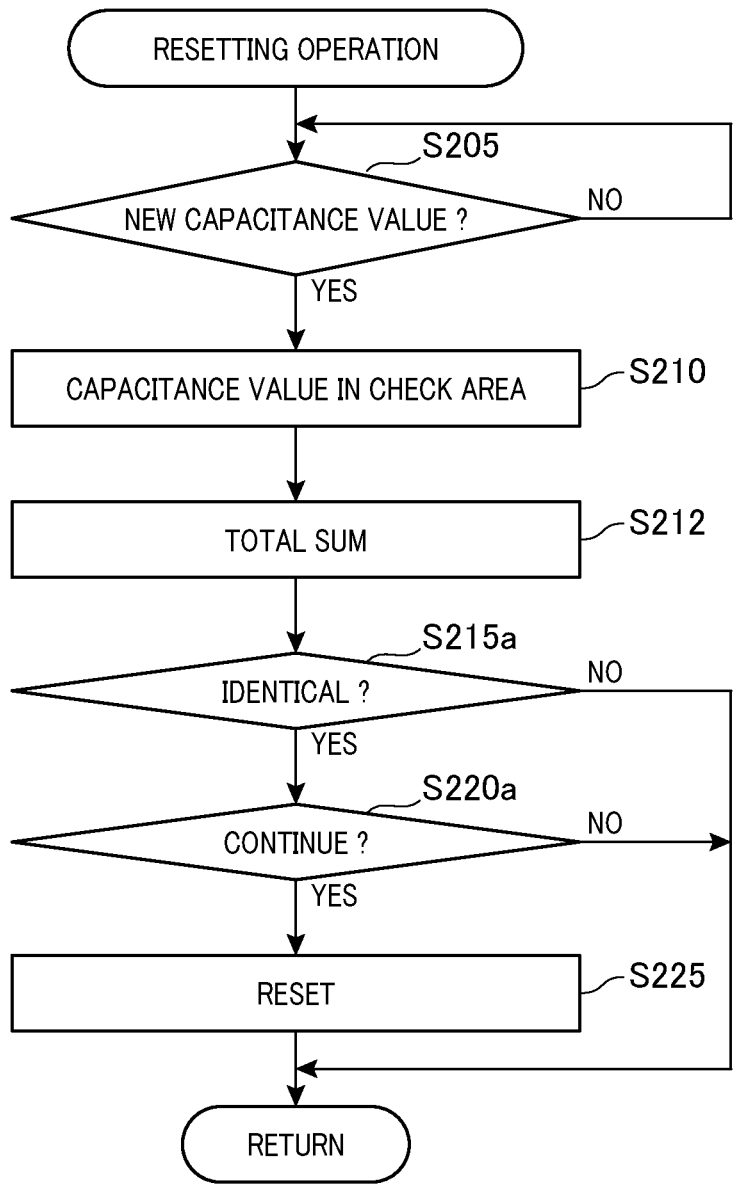
FIG. 7 is a flow chart explaining a resetting operation of a second embodiment.

FIG. 7 is a flow chart explaining a resetting operation of a second embodiment. The resetting operation of the second embodiment adds a step S212 to the first embodiment shown in FIG. 3 and operates a step S215a and a step S220a instead of the step S215 and the step S220 of the first embodiment. The remaining steps of the first embodiment shown in FIG. 3 are operated in the same manner in this second embodiment, so that the remaining steps are numbered the same numeral as in FIG. 3. The touch panel equipment 100 as well as the controller for air conditioning 10 are also the same as those of the first embodiment.

When the operation of the step S210 is completed, the touch panel controller 211 calculates the total sum of the capacitance value of every electrode located in the check area (S212).

The touch panel controller 211 compares the total sum of the present (n) step to that of the last (n−1) step. As the possibility of that the total sum of the present (n) step is different to that of the (n−1) last step is usually higher when the touch sensing IC 130 works normally, in the case when the total sum of the present (n) step is not identical with that of the last (n−1) step (S215a: No), the operation returns to the step S205 and the resetting operation of the touch sensing IC 130 (S225) is not done.

On the other hand, in the case when the total sum of the present (n) step is identical with that of the last (n−1) step (S215a: Yes), the touch panel controller 211 decides whether or not the identical number of the total sum continues more than the predetermined threshold timings (S220a). The threshold timings of the present embodiment are two (2), but could be the other number. When the total sum is varied within the threshold timings (S220a: No), the operation returns to the step S205 and the resetting operation of the touch sensing IC 130 (S225) is not done. In the case when the identical total sum is continuing more than the threshold timings (S220a: Yes), the resetting operation of the touch sensing IC 130 (S225) is done by completing the operation of the step S225.

The touch panel equipment 100 of this second embodiment could have the same effect as that of the first embodiment. Additionally, since this second embodiment uses the total sum of the capacitance value of nine (9) electrodes located in the check area A1 as the parameter for deciding whether or not the resetting operation of the touch sensing IC 130 is required, the calculation load of the CPU 210 could be reduced compare to the calculation load of the first embodiment.

C. Third Embodiment

Figure 8:
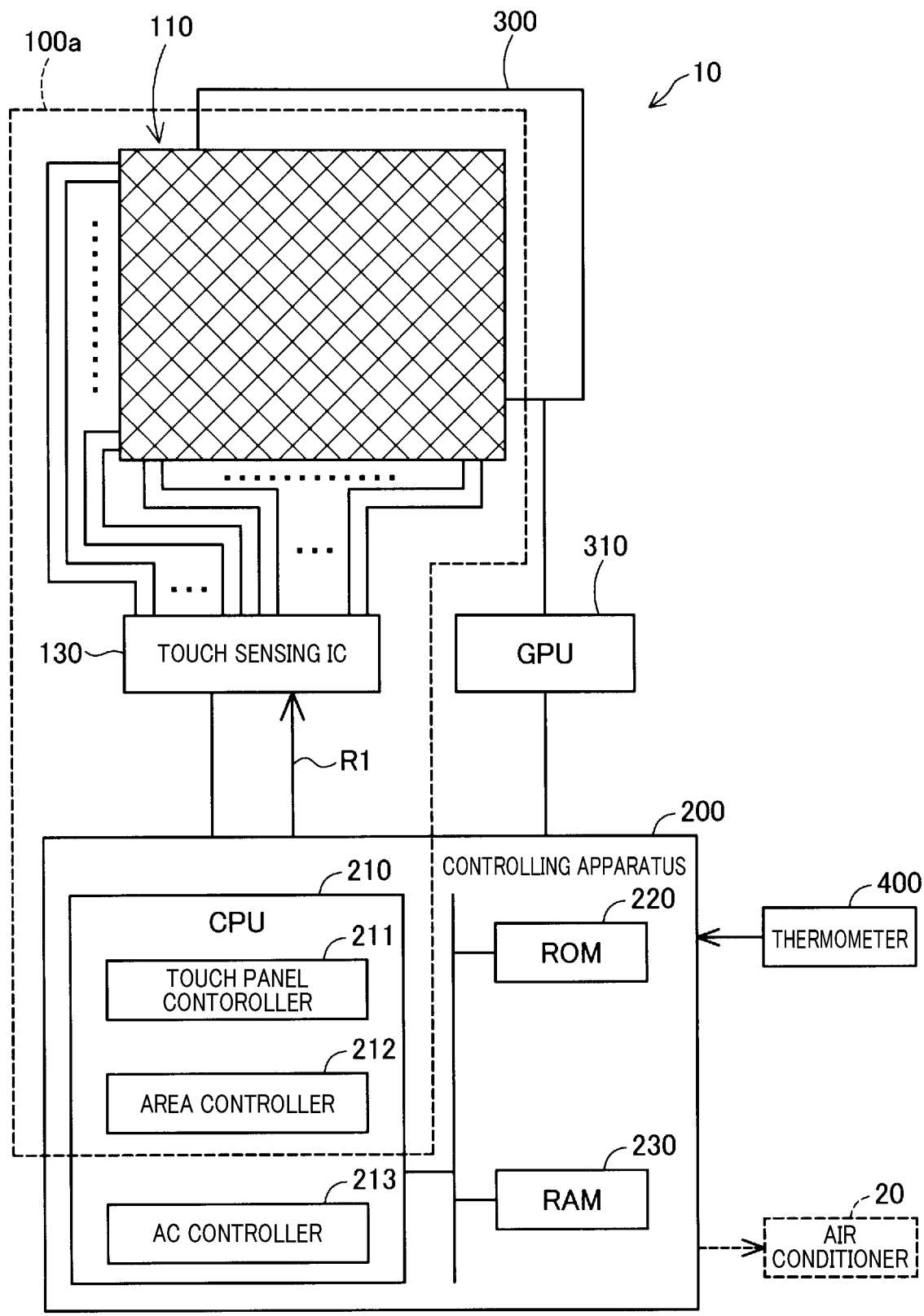
FIG. 8 is a block diagram showing essential function of a third embodiment of a touch panel equipment for air conditioning.

FIG. 8 is a block diagram showing essential function of a third embodiment of a touch panel equipment 100a for air conditioning. Compare to the touch panel equipment 100 of the first embodiment shown in FIG. 1, the CPU 210 of the touch panel equipment 100a of this third embodiment works as an area controller 212 other than the touch panel controller 211. The remaining components of this third embodiment are the same as those of the first embodiment, so that the corresponding components of this third embodiment are numbered the same numeral as those described in FIG. 1.

The area controller 212 decides the largeness as well as the position of the check area A1. The largeness of the check area A1 is the same as described above, namely nine (9) (3×3) electrodes, but the position of the check area A1 could be changed. As the same as those of the touch panel controller 211 and the AC controller 213 of the first embodiment, the function of the area controller 212 is carried out by the controlling program installed in the ROM 220.

Figure 9:
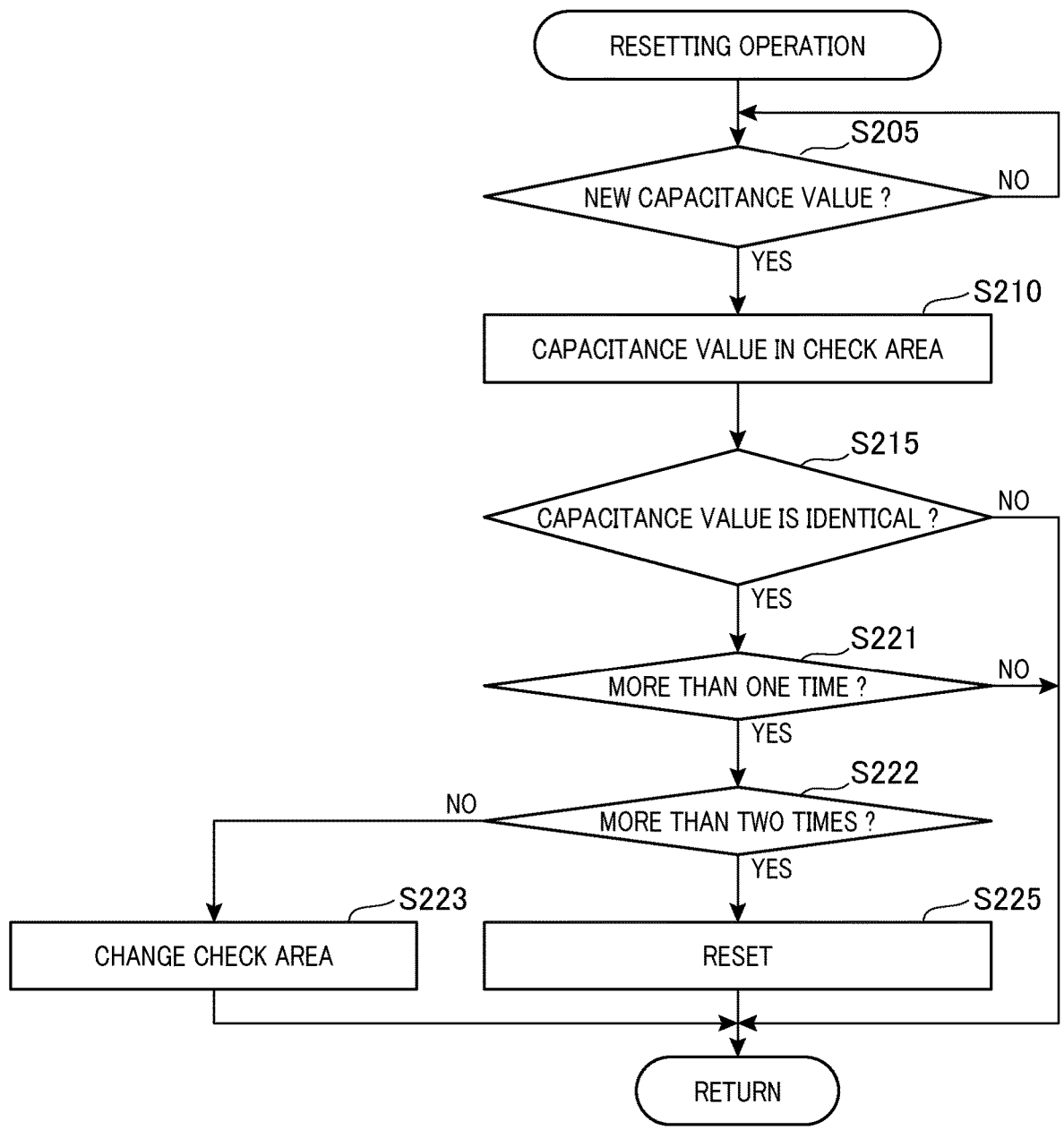
FIG. 9 is a flow chart explaining a resetting operation of a third embodiment.

FIG. 9 is a flow chart explaining a resetting operation of the third embodiment. The resetting operation of the third embodiment adds the steps of S221, S222 and S223 to the first embodiment and eliminates the step S220 shown in FIG. 3. As the remaining steps of the third embodiment are the same as those of the first embodiment, the same step has the same numeral of that of shown in FIG. 3.

In the case when the capacitance value of the electrodes in the check area is not varied more than one (1) time (S221: Yes), the touch panel controller 211 decides the continuing number is more than the threshold timings of two (2) (S222). As the case shown in FIG. 6, though the capacitance value of the electrodes in the check area A1 of the last (n−1) step is identical with those of the one step before last (n−2), the last (n−1) step continues the identical capacitance value only one (1) time so that the step (S222) decides "No". At this moment (S222: No), the area controller 212 changes the position of the check area (S223). After the new position of the check area is set (S223), the operation returns to the step 205 and, therefore, the resetting operation of the touch sensing IC 130 is not done.

FIG. 10 explains the change of the check area of the third embodiment. The upper table shows the check area A1 prior to the step S223 and the lower table shows the check area after the step S223. The area controller 212 of the present embodiment changes from the check area A1 of upper right (the upper table of FIG. 10) to the check area A2 of lower left (the lower table of FIG. 10). As the operation returns to the step S205 after the new check area A2 is decided, the proceeding of the steps S205-S222 are then operated.

When the capacitance value of the electrodes in the new check area A2 is continued only one (1) time and is not continued more than the threshold timings such as two (2) times (S222: No), the area controller 212 changes the position of the check area (S223). Such changed check area is the different area from the original check area A1 as well as the new check area A2, however, the changed check area may be returned to the original check area A1. When the capacitance value of the electrodes in the new check area A2 is continued more than the threshold timings such as two (2) times (S222: Yes), the resetting operation of the touch sensing IC 130 is done by the step S225.

The touch panel equipment 100a of this third embodiment has the same effect as that of the touch panel equipment 100 of the first embodiment. Additionally, as the resetting operation of the touch sensing IC 130 is applied when the capacitance value of the electrodes of the original check area A1 continues one (1) time and that of the new check area A2 continues more than the threshold timings, the resetting operation is operated when the possibility that the malfunction of the electrodes occurs in the entire area is highly presumed. Accordingly, this third embodiment could reduce the unnecessary resetting operation. In the case the check area is fixed such as described in the first embodiment, the touch sensing IC 130 makes the resetting operation only the electrodes located in the check area have malfunction such as the disconnection of wire and remaining electrodes located other area than the check area A1 work correctively. Further, as the area of the new check area A2 of the third embodiment is not overlapped with the area of the original check area A1, the error occurred in the entire area of the touch sensor area 110 could be detected effectively.

D. Other Embodiments (D1) Though the number of the electrodes located in the check area A1 and A2 of the first and the third embodiment is nine (9) (3×3), the number should not be limited nine (9). For example, eight (8) (8×1) electrodes located in the check area A3 as shown in FIG. 11 may be used, six (6) (1×6) electrodes located in the check area A4 as shown in FIG. 12 may be used, and the check area A5 which is made by three (3) sub-check areas A51, A52 and A53 each sub-check area locates separately from each other as shown in FIG. 13 may also be used. Though number of the sub-check area A51, A52 and A53 described in FIG. 13 is four (4) (2×2), the largeness of the sub-check areas A51, A52 and A53 may be different from each other, and the number of the sub-check areas A51, A52 and A53 may be two (2) or more than four (4). At least one of the sub-check areas A51, A52 and A53 may be overlapped with the other sub-check areas A51, A52 and A53.

(D2) Though the resetting operation of the third embodiment changes the position of the check area A1 (S223), the present disclosure shall not be limited the position. For example, as shown in FIG. 14, the position of the original check area A1 and the new check area A6 could remain at the upper right corner but the largeness of the check area could be enlarged from nine (9) (3×3) of the original check area A1 to sixteen (16) (4×4) of the new check area A6. FIG. 15 shows the other embodiment varying both the largeness and the position from nine (9) (3×3) upper right of the original check area A1 to fifteen (15) (3×5) lower left of the new check area A7. As such embodiment shown in FIG. 15 enlarges the largeness of the check area, the resetting operation of the touch sensing IC 130 could be operated when the error caused by the static electrical charge is presumed to be occurred in the entire electrodes.

(D3) Though the check area of the above described embodiment is limited in a part of entire electrodes, the capacitance value of the entire electrodes could be sensed, so that the error of the touch sensing IC 130 is found very correctively. The largeness of the check area also could be varied, only one (1) electrode may be located in the check area.

(D4) Though the comparing object of the first and the third embodiments is the capacitance value of each of the electrodes located in the check area and that of the second embodiment is the total sum of the capacitance value of the electrodes in the check area, the comparing object of the present disclosure shall not be limited within these embodiments. The middle value or the average value of the capacitance value of the electrodes in the check area may be used as the comparing object.

(D5) Though the new check area A2 and the original check area A1 of the third embodiment is not overlapped, a part of the new check area A2 may be overlapped with the original check area A1 so that in the case the capacitance value of the electrodes located in the overlapping area is continuing and the capacitance value of the electrodes located other area than the overlapping area is changed, the error caused such as disconnection of wire occurring only in the overlapping area could be detected.

(D6) The touch panel controller 211 of the present disclosure may be located other area than the controlling apparatus 200. Namely, the touch panel controller 211 may exist in the other computer.

(D6) At least a part of the function carried out by the hardware of the present disclosure may be transferred to the software, and at least a part of the function carried out by the software may be transferred to the hardware. For example, at least one function carried out by the touch panel controller 211, the area controller 212 and the AC controller 213 may be transferred to an integrated circuit, a discrete circuit, or a module of the circuit. In the case at least a part of the function is carried out by the software, such software (computer program) could be provided in the computer readable memory form such as a mobile memory of flexible disk or CD-ROM as well as a memory of RAM and ROM installed in the computer and an external memory of hard disk connected to the computer. Accordingly, the computer readable memory includes any memory which fixes the data packet.

As explained above, the present disclosure should not be limited to the embodiment shown in the drawings, each of element of the present disclosure may be modified within the scope of the description which could achieve the same function.

What is claimed is:

1. Touch panel equipment for air conditioning, comprising:
   a plurality of electrodes arranged in a two-dimensional matrix;
   a touch sensing IC for scanning capacitance of the electrodes;
   a touch panel controller for deciding, when a user touches the touch panel equipment, (i) a value of the capacitance sensed by the touch sensing IC and (ii) a touching position from the capacitance sensed by the touch sensing IC, wherein
   even when the user does not touch the touch panel equipment, the touch panel controller also decides (i) the value of the capacitance sensed by the touch sensing IC and (ii) the position sensed by the touch sensing IC, the value of the capacitance sensed by the touch sensing IC changing due to static electricity in air next to the touch panel equipment sensed by the touch sensing IC, and
   when the user does not touch the touch panel equipment but the value of the sensed capacitance is changed due to the static electricity in the air next to the touch panel equipment, (i) the touch panel controller resets the touch sensing IC when a value of the capacitance of at least one of the electrodes located in a check area is fixed to the same value and is not changed for more than a plurality of predetermined threshold times, though the static electricity in the air next to the touch panel equipment is changed, and (ii) the touch panel controller does not reset the touch sensing IC when the value of the capacitance of the at least one electrode located in the check area is changed in accordance with the static electricity in the air next to the touch panel equipment, the capacitance of which is sensed by the touch sensing IC, and is not fixed within the threshold times.

2. The touch panel equipment for air conditioning of claim 1, wherein
   the at least one electrode includes a plurality of the electrodes, and
   the touch panel controller (i) adds the value of the capacitance of each of the electrodes located in the check area to calculate a total sum, (ii) resets the touch sensing IC when the total sum of the capacitances of the electrodes located in the check area remains constant during the threshold times, and (iii) does not reset the touch sensing IC when the total sum of the capacitances of the electrodes located in the check area is changed within the threshold times.

3. The touch panel equipment for air conditioning of claim 1, wherein
   a part of the plurality of electrodes are located within the check area.

4. The touch panel equipment for air conditioning of claim 1, further comprising;
   an area controller setting the check area, wherein
   the area controller changes at least one of a position and a size of the check area from an original check area to a new check area when the value of the capacitance of the at least one electrode located in the original check area remains constant during the threshold times, and
   the touch panel controller resets the touch sensing IC when the value of the capacitance of the at least one electrode located in the new check area remains constant during the threshold times, and the touch panel controller does not reset the touch sensing IC when the value of the capacitance of the at least one electrode located in the new check area is changed within the threshold times.

5. The touch panel equipment for air conditioning of claim 4, wherein
   the area controller sets the check area so that at least a part of the original check area is included within the new check area.

6. The touch panel equipment for air conditioning of claim 4, wherein
   the area controller sets the check area so that the new check area is a different area from the original check area.

7. The touch panel equipment for air conditioning of claim 4, wherein
   the area controller sets the check area so that the size of the new check area is greater than that of the original check area.

* * * * *